United States Patent
Stahl et al.

(10) Patent No.: US 11,316,670 B2
(45) Date of Patent: Apr. 26, 2022

(54) SECURE COMMUNICATIONS USING NETWORK ACCESS IDENTITY

(71) Applicant: Telefonaktiebolaget LM Ericsson (publ), Stockholm (SE)

(72) Inventors: Per Stahl, Klagshamn (SE); Patrik Ekdahl, Dalby (SE); Petri Mikael Johansson, Bjärred (SE); Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 261 days.

(21) Appl. No.: 16/623,534

(22) PCT Filed: Jul. 3, 2017

(86) PCT No.: PCT/EP2017/066465
§ 371 (c)(1),
(2) Date: Dec. 17, 2019

(87) PCT Pub. No.: WO2019/007476
PCT Pub. Date: Jan. 10, 2019

(65) Prior Publication Data
US 2020/0403780 A1 Dec. 24, 2020

(51) Int. Cl.
*H04L 9/08* (2006.01)
*H04L 9/32* (2006.01)
(Continued)

(52) U.S. Cl.
CPC ............. *H04L 9/083* (2013.01); *H04L 9/085* (2013.01); *H04L 9/0838* (2013.01);
(Continued)

(58) Field of Classification Search
CPC ...... H04L 9/083; H04L 9/0838; H04L 63/062
See application file for complete search history.

(56) References Cited

U.S. PATENT DOCUMENTS

2006/0196931 A1  9/2006  Holtmanns et al.
2008/0215888 A1* 9/2008  Barriga .................. H04W 12/06
                                                    713/176
(Continued)

FOREIGN PATENT DOCUMENTS

WO   WO-2015072899 A1 *  5/2015  ........ H04W 12/0431
WO   WO-2016024893 A1 *  2/2016  ............ H04L 63/08
(Continued)

OTHER PUBLICATIONS

Eronen, P. et al., "Pre-Shared Key Ciphersuites for Transport Layer Security (TLS)", Standards Track, Dec. 1, 2005, pp. 1-15, RFC 4279, Network Working Group.

(Continued)

*Primary Examiner* — David J Pearson
(74) *Attorney, Agent, or Firm* — Christopher & Weisberg, P.A.

(57) ABSTRACT

There is provided mechanisms for enabling secure communication between a first communications device and a second communications device. A method is performed by the first communications device. The method comprises performing a network attachment procedure with an authentication server. The method comprises establishing, during the network attachment procedure, a shared secret between the first communications device and the authentication server. The shared secret is established by running an authentication and key agreement protocol as part of the network attachment procedure with a network access identity of the first communications device as input. The method comprises deriving an application level shared key for the first communications device from the shared secret. The shared key is to be used for secure communication between the first communications device and the second communications device.

25 Claims, 9 Drawing Sheets

(51) Int. Cl.
  *H04W 12/06* (2021.01)
  *H04W 12/0431* (2021.01)
  *H04L 29/06* (2006.01)

(52) U.S. Cl.
  CPC .......... *H04L 9/3213* (2013.01); *H04L 9/3242* (2013.01); *H04L 63/062* (2013.01); *H04W 12/0431* (2021.01); *H04W 12/06* (2013.01)

(56) References Cited

U.S. PATENT DOCUMENTS

| | | | | |
|---|---|---|---|---|
| 2015/0295905 | A1* | 10/2015 | Leicher | H04L 63/061 726/4 |
| 2016/0234177 | A1* | 8/2016 | Bone | H04B 1/3816 |
| 2016/0295346 | A1* | 10/2016 | Iwai | H04L 69/08 |

FOREIGN PATENT DOCUMENTS

| | | | |
|---|---|---|---|
| WO | 2016113593 | A1 | 7/2016 |
| WO | 2016165737 | A1 | 10/2016 |

OTHER PUBLICATIONS

Selander, G. et al., "Object Security of CoAP (OSCOAP)", Standards Track, Dec. 19, 2016, pp. 1-45, Internet-Draft, CoRE Working Group.

Selander, G. et al., "Ephemeral Diffie-Hellman Over COSE (EDHOC)", Standards Track, Oct. 31, 2016, pp. 1-44, Internet-Draft, ACE Working Group.

3rd Generation Partnership Project, "3rd Generation Partnership Project; 3rd Generation Partnership Project; Technical Specification Group Services and System Aspects; Generic Authentication Architecture (GAA); Generic Bootstrapping Architecture (GBA) (Release 15)", Technical Specification, 3GPP TS 33.220 V15.0.0, Jun. 1, 2017, pp. 1-93, 3GPP.

3rd Generation Partnership Project, "3rd Generation Partnership Project; 3rd Generation Partnership Project; Technical Specification Group Services and System Aspects; Generic Authentication Architecture (GAA); Generic Bootstrapping Architecture (GBA) (Release 14)", Technical Specification, 3GPP TS 33.220 V14.1.0, Jun. 1, 2017, pp. 1-93, 3GPP.

* cited by examiner

SECURE COMMUNICATIONS USING NETWORK ACCESS IDENTITY

TECHNICAL FIELD

Embodiments presented herein relate to methods, communications devices, an authentication server, computer programs, and a computer program product for enabling secure communication between a first communications device and a second communications device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is security. In general terms, proper security mechanisms are needed to prevent misuse of connected devices. As a non-limiting illustrative example, distributed denial of service (DDoS) attacks against popular websites might utilize poorly protected connected devices, such as cameras running the Internet Protocol (IP), routers, digital video recorders running the Internet Protocol, and so on.

Connected devices may also be entrusted with valuable, sensitive, or private data that needs to be protected from unauthorized access. Identity management is a central part of security and device life-cycle management. A connected device generally needs an identity to be able to identify and authenticate itself to its counterparts in the network in order to establish secure communication to other connected devices or services. This is needed at the connectivity layer when connecting to a network and at the application layer when connecting to a service of the network. Secure communication protects sensor data, or control data for actuators, but is also needed for provisioning of identities to the connected device and for secure configuration of the connected device, including secure firmware update.

Identities are also the base for an access control mechanism controlling who can access resources of a connected device, including who can provision additional identities to the connected device.

A simplified block diagram of a communications network 100 is illustrated in FIG. 1. A connected device 200 is provided network access by a network node 110, such as a network gateway (GW) or an access point (AP) of a connectivity provider network 120. The connectivity provider network 120 further comprises an authentication server 300, which could be an authentication, authorization, and accounting (AAA) server. Subscriber information for connectivity may be stored in the authentication server 300 or may be stored in a separate network entity, which could be a home subscriber server (HSS) 140, and which separate network entity also provides authentication material for use by the authentication server 300. The connectivity provider network 120 in turn is operatively connected to a service network 150, such as the Internet, possibly comprising at least one second communications device 400 that could be a data server (DS). The service network 150 is further operatively connected to an enterprise network 160. The enterprise network 160 comprises a management server (MS) 170 and possibly at least one second communications device 400 that could be a DS.

As an example, the connected device 200 could belong to the enterprise of the enterprise network 160 and be configured to report sensor data (or other type of data) to one or more of the second communications devices 400 located either in the enterprise network 160 or in the service network 150. The enterprise manages the connected device 200 through the management server 170. Management comprises providing identities and credentials to the connected device 200 and the second communications devices 400 to which the connected device 200 is communicating with such that secure communication can be established. The connectivity provider network 120 may, partly or fully, also be provided by the enterprise.

It could be challenging to provide secure communications between the connected device 200 (hereinafter denoted a first communications device 200) and the second communications device 400.

SUMMARY

An object of embodiments herein is to enable secure communication between a first communications device and a second communications device.

According to a first aspect there is presented a method for enabling secure communication between a first communications device and a second communications device. The method is performed by the first communications device. The method comprises performing a network attachment procedure with an authentication server. The method comprises establishing, during the network attachment procedure, a shared secret between the first communications device and the authentication server. The shared secret is established by running an authentication and key agreement protocol as part of the network attachment procedure with a network access identity of the first communications device as input. The method comprises deriving an application level shared key for the first communications device from the shared secret. The shared key is to be used for secure communication between the first communications device and the second communications device.

According to a second aspect there is presented a communications device for enabling secure communication between the communications device and a second communications device. The communications device comprises processing circuitry. The processing circuitry is configured to cause the communications device to perform a network attachment procedure with an authentication server. The processing circuitry is configured to cause the communications device to establish, during the network attachment procedure, a shared secret between the communications device and the authentication server. The shared secret is established by running an authentication and key agreement protocol as part of the network attachment procedure with a network access identity of the communications device as input. The processing circuitry is configured to cause the communications device to derive an application level shared key for the communications device from the shared secret. The shared key is to be used for secure communication between the communications device and the second communications device.

According to a third aspect there is presented a communications device for enabling secure communication between the communications device and a second communications device. The communications device comprises processing circuitry and a storage medium. The storage medium stores instructions that, when executed by the processing circuitry, cause the communications device to perform operations, or steps. The operations, or steps, cause the communications device to perform a network attachment procedure with an authentication server. The operations, or steps, cause the communications device to establish, during the network attachment procedure, a shared secret between the communications device and the authentication server. The shared secret is established by running an authentication and key agreement protocol as part of the network attachment procedure with a network access identity of the communications device as input. The operations, or steps, cause the communications device to derive an application level shared key for the communications device from the shared secret. The shared key is to be used for secure communication between the communications device and the second communications device.

According to a fourth aspect there is presented a communications device for enabling secure communication between the communications device and a second communications device. The communications device comprises a network attachment module configured to perform a network attachment procedure with an authentication server. The communications device comprises an establish module configured to establish, during the network attachment procedure, a shared secret between the communications device and the authentication server. The shared secret is established by running an authentication and key agreement protocol as part of the network attachment procedure with a network access identity of the communications device as input. The communications device comprises a derive module configured to derive an application level shared key for the communications device from the shared secret. The shared key is to be used for secure communication between the communications device and the second communications device.

According to a fifth aspect there is presented a computer program for enabling secure communication between a first communications device and a second communications device. The computer program comprises computer program code which, when run on processing circuitry of the first communications device, causes the first communications device to perform a method according to the first aspect.

According to a sixth aspect there is presented a method for enabling secure communication between a first communications device and a second communications device. The method is performed by an authentication server. The method comprises performing a network attachment procedure with the first communications device. The method comprises establishing, during the network attachment procedure, a shared secret between the authentication server and the first communications device. The shared secret is established by running an authentication and key agreement protocol as part of the network attachment procedure with a network access identity of the first communications device as input. The method comprises receiving a request from the second communications device for an application level shared key. The shared key is to be used for secure communication between the first communications device and the second communications device. The method comprises deriving the application level shared key for the first communications device from the shared secret. The method comprises providing the application level shared key to the second communications device.

According to a seventh aspect there is presented an authentication server for enabling secure communication between a first communications device and a second communications device. The authentication server comprises processing circuitry. The processing circuitry is configured to cause the authentication server to perform a network attachment procedure with the first communications device. The processing circuitry is configured to cause the authentication server to establish, during the network attachment procedure, a shared secret between the authentication server and the first communications device. The shared secret is established by running an authentication and key agreement protocol as part of the network attachment procedure with a network access identity of the first communications device as input. The processing circuitry is configured to cause the authentication server to receive a request from the second communications device for an application level shared key. The shared key is to be used for secure communication between the first communications device and the second communications device. The processing circuitry is configured to cause the authentication server to derive the application level shared key for the first communications device from the shared secret. The processing circuitry is configured to cause the authentication server to provide the application level shared key to the second communications device.

According to an eighth aspect there is presented an authentication server for enabling secure communication between a first communications device and a second communications device. The authentication server comprises processing circuitry and a storage medium. The storage medium stores instructions that, when executed by the processing circuitry, cause the authentication server to perform operations, or steps. The operations, or steps, cause the authentication server to perform a network attachment procedure with the first communications device. The operations, or steps, cause the authentication server to establish, during the network attachment procedure, a shared secret between the authentication server and the first communications device. The shared secret is established by running an authentication and key agreement protocol as part of the network attachment procedure with a network access identity of the first communications device as input. The operations, or steps, cause the authentication server to receive a request from the second communications device for an application level shared key. The shared key is to be used for secure communication between the first communications device and the second communications device. The operations, or steps, cause the authentication server to derive the application level shared key for the first communications device from the shared secret. The operations, or steps, cause the authentication server to provide the application level shared key to the second communications device.

According to a ninth aspect there is presented an authentication server for enabling secure communication between a first communications device and a second communications device. The authentication server comprises a network attachment module configured to perform a network attachment procedure with the first communications device. The authentication server comprises an establish module configured to establish, during the network attachment procedure, a shared secret between the authentication server and the first communications device. The shared secret is established by running an authentication and key agreement protocol as part of the network attachment procedure with a network access identity of the first communications device as input. The authentication server comprises a receive module configured to receive a request from the second communications device for an application level shared key. The shared key is to be used for secure communication between the first communications device and the second communications device. The authentication server comprises a derive module configured to derive the application level shared key for the first communications device from the shared secret. The authentication server comprises a provide module configured to provide the application level shared key to the second communications device.

According to a tenth aspect there is presented a computer program for enabling secure communication between a first communications device and a second communications device. The computer program comprises computer program code which, when run on processing circuitry of an authentication server, causes the authentication server to perform a method according to the sixth aspect.

According to an eleventh aspect there is presented a method for enabling secure communication between a first communications device and a second communications device. The method is performed by the second communications device. The method comprises receiving instructions from the first communications device to retrieve an application level shared key from an authentication server when establishing the secure communication with the first communications device. The shared key is to be used for the secure communication between the first communications device and the second communications device. The method comprises providing a request for the application level shared key from the authentication server. The method comprises receiving the application level shared key from the authentication server.

According to a twelfth aspect there is presented a communications device for enabling secure communication between a first communications device and the communications device. The communications device comprises processing circuitry. The processing circuitry is configured to cause the communications device to receive instructions from the first communications device to retrieve an application level shared key from an authentication server when establishing the secure communication with the first communications device. The shared key is to be used for the secure communication between the first communications device and the communications device. The processing circuitry is configured to cause the communications device to provide a request for the application level shared key from the authentication server. The processing circuitry is configured to cause the communications device to receive the application level shared key from the authentication server.

According to a thirteenth aspect there is presented a communications device for enabling secure communication between a first communications device and the communications device. The communications device comprises processing circuitry and a storage medium. The storage medium stores instructions that, when executed by the processing circuitry, cause the communications device to perform operations, or steps. The operations, or steps, cause the communications device to receive instructions from the first communications device to retrieve an application level shared key from an authentication server when establishing the secure communication with the first communications device. The shared key is to be used for the secure communication between the first communications device and the communications device. The operations, or steps, cause the communications device to provide a request for the application level shared key from the authentication server. The operations, or steps, cause the communications device to receive the application level shared key from the authentication server.

According to a fourteenth aspect there is presented a communications device for enabling secure communication between a first communications device and the communications device. The communications device comprises a receive module configured to receive instructions from the first communications device to retrieve an application level shared key from an authentication server when establishing the secure communication with the first communications device. The shared key is to be used for the secure communication between the first communications device and the communications device. The communications device comprises a provide module configured to provide a request for the application level shared key from the authentication server. The communications device comprises a receive module configured to receive the application level shared key from the authentication server.

According to a fifteenth aspect there is presented a computer program for enabling secure communication between a first communications device and a second communications device, the computer program comprising computer program code which, when run on processing circuitry of the second communications device, causes the second communications device to perform a method according to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these communications devices, these authentication servers, and these computer programs enable secure communication between the first communications device and the second communications device in an efficient manner.

Advantageously these methods, these communications devices, these authentication servers, and these computer programs enable re-use of already existing shared keys between the first communications device and the authentication server from the network attachment procedure for deriving application level shared keys, thereby minimizing the management required for periodically changing and distributing new keys to second communications devices with which the first communications devices communicate.

Advantageously, the herein disclosed mechanisms for enabling secure communication between the first communications device and the second communications device are independent of what type network access identity is used. For example, the herein disclosed mechanisms works both with network access using 3GPP identities and non-3GPP identities.

Advantageously, the herein disclosed mechanisms for enabling secure communication between the first communications device and the second communications device can be used to derive and share multiple application level keys between the first communications device and the second communications device.

Advantageously, with the herein disclosed mechanisms for enabling secure communication between the first communications device and the second communications device the management and control of what second communications device that may request and receive the application level shared secret from the authentication server is independent of the connectivity network and the connectivity provider.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate.

Likewise, any advantage of the first aspect may equally apply to the second, third, fourth, fifth, sixth, seventh, eight, ninth, tenth, eleventh twelfth, thirteen, fourteenth, fifteenth and sixteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above it could be challenging to provide secure communications between the first communications device 200 and the second communications device 400.

In further detail, the Generic Bootstrapping Architecture (GBA) allows to derive an application specific key between a device and a Network Application Function (NAF). However, GBA is only available for third generation partnership project (3GPP) based devices used in 3GPP based networks, and also requires GBA support from the 3GPP modem of the device (which is not yet widespread). GBA is complex and generates a lot of signaling between the first communications device 200 and the network 100. A method called vertical GBA has been disclosed according to which parts of the computations performed under the GBA, such as sharing a key between the first communications device 200 and a 3GPP Bootstrapping Server Function (BSF), is computed as part of the network attachment protocol to reduce the signaling at a later stage when an application level key needs to be computed.

Vertical GBA requires a data server (NAF, using GBA terminology, where NAF is short for Network Application Function) to have a trust relation with the connectivity provider to be able to request an application specific key. The connectivity provider is either the home mobile network operator owning the HSS or an operator with roaming agreement with the home operator. However, it could be advantageous for enterprises owning first communications devices 200 and services to easily be able to control what services (e.g. represented by application layer functions) that are allowed to communicate and share application keys with each second communications device 400, which is something that may vary over time, without enterprise and service providers running the data server having to involve and establish new trust relations with the connectivity provider as required by GBA.

Embodiments disclosed herein therefore relate to mechanisms for enabling secure communication between a first communications device 200 and a second communications device 400 and where the connectivity used by the first communications device 200 is not limited to 3GPP cellular connectivity or the use of 3GPP identities for network access.

Figure 2:
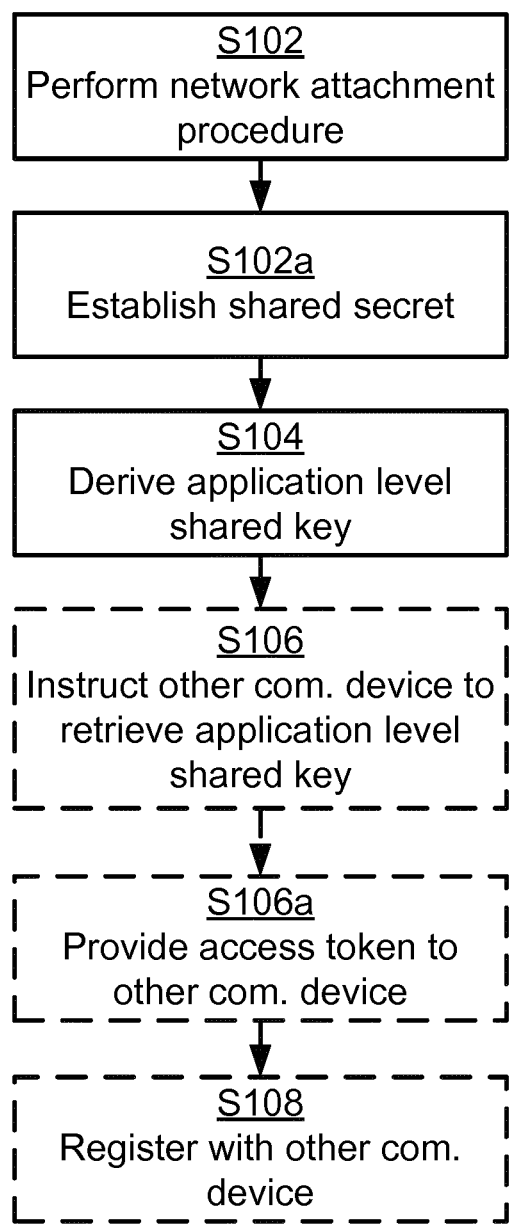
FIGS. 2, 3, and 4 are flowcharts of methods according to embodiments.

Reference is now made to FIG. 2 illustrating a method for enabling secure communication between a first communications device 200 and a second communications device 400 as performed by the first communications device 200 according to an embodiment.

In order for the first communications device 200 to communicate with the second communications device 400 it needs to attach to the network 100. Particularly, the first communications device 200 is configured to perform step S102:

S102: The first communications device 200 performs a network attachment procedure with an authentication server 300.

The first communications device 200 typically requests access to the network 100 through a network gateway.

The first communications device 200 runs an authentication and key agreement protocol as part of the network attachment in which the identity, with possible credentials to authenticate the network, is used. Typically, mutual authentication is performed using the device identity and network credentials. As part of the protocol a shared secret is derived. Thus, the first communications device 200 is configured to perform step S102a:

S102a: The first communications device 200 establishes, during the network attachment procedure, a shared secret between the first communications device 200 and the authentication server 300. The shared secret is established by running the authentication and key agreement protocol as part of the network attachment procedure with a network access identity of the first communications device 200 as input.

The first communications device 200 is thus configured to use its network access identity as a base for establishing secure communication between the first communications device 200 and second communications devices 400 to which the first communications device 200 is intended to securely communicate.

From this shared secret a master session secret may be derived and used in order to derive traffic encryption and integrity protection keys that are used to protect the communication between the first communications device 200 and the second communications device 400. The master session secret may also be used for mutual authentication between the first communications device 200 and the second communications device 400. Thus, the first communications device 200 is configured to perform step S104:

S104: The first communications device 200 derives an application level shared key for the first communications device 200 from the shared secret. The shared key is to be used for secure communication between the first communications device 200 and the second communications device 400.

Other shared keys may also be derived for use as application level shared secrets. As will be disclosed below, the master session secret is then securely communicated to the second communications device 400 by the authentication server 300.

Embodiments relating to further details of enabling secure communication between a first communications device 200 and a second communications device 400 as performed by the first communications device 200 will now be disclosed.

In some aspects the first communications device 200 instructs the second communications device 400 to retrieve the application level shared key from the authentication server 300 as part of the signalling with the second communications device 400 to establish the secure communication to the first communications device 200. Hence, according to an embodiment the first communications device 200 is configured to perform (optional) step S106:

S106: The first communications device 200 instructs the second communications device 400 to retrieve the application level shared key from the authentication server 300 when establishing the secure communication with the second communications device 400.

In some aspects the first communications device 200 provides an access token to the second communications device 400 to be used when requesting application level shared key from the authentication server 300. Hence, according to an embodiment the first communications device 200 is configured to perform (optional) step S106a:

S106a: The first communications device 200 provides an access token to the second communications device 400 when instructing the second communications device 400 to retrieve the application level shared key from the authentication server 300. The access token at least comprises a session identifier identifying the network attachment session between the first communications device 200 and the authentication server 300.

The access token could be provided from the first communications device 200 to the second communications device 400 as part of the signaling to establish secure communication. In some aspects, step S106a is thus performed as part of step S106.

In further detail, the access token could, in addition to the session identifier, comprises an application identifier (Ap-pID) of an application run by the first communications device 200, a hash of the public key or certificate of the second communications device 400, and a Message Authentication Code (MAC). The MAC could be computed for the concatenation of the previously mentioned content of the access token fields (session identifier AppID hash) and using a key which is derived from the shared secret.

The hash of the public key or certificate of the second communications device 400 could be part of the information configured in the first communications device 200 by the management server 170 (or an authorization server of the enterprise). As will be further disclosed below, the application identifier can be used to provide different application level shared keys to different applications on the same first communications device 200.

In general terms, the session identifier identifies the network attachment session. As a specialization it might contain information, such as name, identifier, address, etc. that is used by the second communications device 400 to determine what authentication server 300 to contact, but that may also be hard-coded in the second communications device 400 or determined by the second communications device 400 from other information.

There could be different types of session identifiers. According to an embodiment the session identifier is a bootstrapping transaction identifier (B-TID).

In some aspects the application level shared key is used as a shared secret in the protocol used by the first communications device and the second communications device 400 to establish secure communication. Hence, according to an embodiment the first communications device 200 is configured to perform (optional) step S108:

S108: The first communications device 200 registers with the second communications device 400 once having established the secure communication with the second communications device 400 using the application level shared key.

There could be different protocols used during the secure communication between the first communications device 200 and the second communications device 400. As a non-limiting example, any of the protocols Datagram Transport Layer Security Pre-Shared Key (DTLS-PSK), Transport Layer Security Pre-Shared Key (TLS-PSK) or Object Security for CoAP (OSCOAP) where CoAP is short for Constrained Application Protocol) can be used during the secure communication between the first communications device 200 and the second communications device 400.

The provisioning of the network access identity may be performed in different steps of the manufacturing and deployment process of the first communications device 200 depending on the network 100 and on the use case. The entity managing the first communications device 200, e.g. the device owner, may be the entity that provision network access identities for use during operation. This provisioning might be performed via the MS 170 using e.g. the Lightweight Machine-to-Machine (LwM2M) protocol. This provisioning might, alternatively, be performed by a separate entity managing the connectivity of the first communications device 200. For secure provisioning of network access identities some credentials could be needed at the first communications device 200 and the MS 170 that the other part trusts. This may be an identity configured during manufacturing, during system integration, or during the bootstrapping phase of the first communications device 200. For example, public-private key pairs may be used from which secure communication can be established using TLS or DTLS.

However, it is possible to install a network access identity during manufacturing or a system integration phase that can be used when establishing secure communication at the application layer with MS 170 (or a bootstrapping server (BS) that configures information about the MS 170 according to embodiments disclosed herein. For this to be possible, information about the MS 170 (or BS) such as its Uniform Resource locator (URL), an identifier of the MS 170 and hash of its public key/certificate also needs to be configured.

Figure 3:
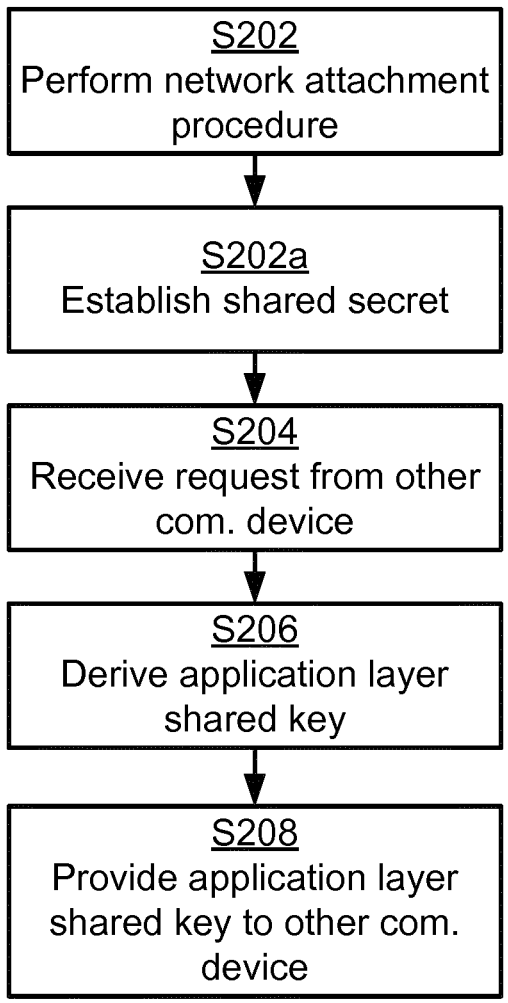

Reference is now made to FIG. 3 illustrating a method for enabling secure communication between a first communications device 200 and a second communications device 400 as performed by the authentication server 300 according to an embodiment.

In general terms, the authentication server 300 is configured to support the first communications device 200 in deriving and providing key information to the second communications device 400, where the second communications device 400 in turn is configured to trust the authentication server 300.

As disclosed above, the first communications device 200 needs to attach to the network 100 in order to communicate with the second communications device 400. Therefore, the authentication server 300 is configured to perform step S202:

S202: The authentication server 300 performs a network attachment procedure with the first communications device 200.

The authentication server 300 runs an authentication and key agreement protocol as part of network attachment. Particularly, the authentication server 300 is configured to perform step S202a:

S202a: The authentication server 300 establishes, during the network attachment procedure, a shared secret between the authentication server 300 and the first communications device 200. The shared secret is established by running an authentication and key agreement protocol as part of the network attachment procedure with a network access identity of the first communications device 200 as input.

As disclosed above, an application level shared key is to be used for secure communication between the first communications device 200 and the second communications device 400. Particularly, the authentication server 300 is configured to perform step S204:

S204: The authentication server 300 receives a request from the second communications device 400 for an application level shared key, where the application level shared key is to be used for secure communication between the first communications device 200 and the second communications device 400.

The application level shared key is derived from the shared secret. Particularly, the authentication server 300 is configured to perform step S206:

S206: The authentication server 300 derives the application level shared key for the first communications device 200 from the shared secret.

The second communications device 400 is then provided with the application level shared key. Particularly, the authentication server 300 is configured to perform step S208:

S208: The authentication server 300 provides the application level shared key to the second communications device 400.

Embodiments relating to further details of enabling secure communication between a first communications device 200 and a second communications device 400 as performed by the authentication server 300 will now be disclosed.

For the purpose of deriving application level secrets both the first communications device 200 and the authentication server 300 might store the shared secret and the session identifier. For privacy reasons the session identifier may be a random number. The authentication server 300 might also stores a device identifier of the first communications device 200. In some aspects the device identifier is the network access identifier provided as part of the authentication and key agreement protocol, but may also be another device identifier based on some translation available to the authentication server 300.

In some aspects, upon receiving a request for the application level shared key the authentication server 300 uses the session identifier to search its database to retrieve a database entry representing the device identifier, the shared secret, and validity information. Particularly, according to an embodiment the request comprises an access token. The access token at least comprises a session identifier. The session identifier is used to determine which shared secret to use when deriving the application level shared key and for which first communications device 200 to derive the application level shared key.

In some aspects, the authentication server 300 validates the access token using a shared key between the first communications device 200 and the authentication server 300. The access token is bound by the first communications device 200 to the public key/certificate of the second communications device 400. The authentication server 300 checks this binding as part of validation of the access token. Particularly, according to an embodiment the access token is validated by a shared key. The shared key is derived by the authentication server 300 from the shared secret.

In some aspects, if the database entry indicates that the shared secret is still valid the authentication server 300 derives the shared key from the shared secret and verifies a Message Authentication Code (MAC) in the access token. Particularly, according to an embodiment the access token comprises a MAC, and the access token is validated by the authentication server 300 verifying the MAC using the shared key.

In some aspects, if the access token is valid the authentication server 300 computes the hash of the public key or certificate received from the second communications device 400 and compares it to the hash provided in the access token. Particularly, according to an embodiment the request from the second communications device 400 comprises a public key or certificate of the second communications device 400. The access token comprises a hash of the public key or certificate as determined by the first communications device 200. The application level shared key for the first communications device 200 only is derived when there is a match between the hash and a hash, as determined by the authentication server 300, of the public key or certificate comprised in the access token.

That is, in some aspects, if there is a match, the authentication server 300 uses the identifier of the second communications device 400, the device identifier (of the first communications device 200), and the shared secret to compute the application level shared key. The authentication server 300 could then encapsulate the application level shared key using the public key or certificate (where a public key in the certificate is used for the encapsulation) of the second communications device 400. Particularly, according to an embodiment the application level shared key is encapsulated before being provided to the second communications device 400.

An attacker might try to connect to the second communications device 400 by generating a false access token and then act as man-in-the middle in the communication between the authentication server 300 and the second communications device 400 and provide the second communications device 400 with an encapsulated application level shared key of an application level shared key generated by the attacker. To prevent such man-in-the-middle attacks the second communications device 400 could be configured to verify the authenticity and integrity of the encapsulated application level shared key. At a minimum, the authentication sever 300 might therefore have signed the encapsulated application level shared key such that it can be verified by the second communications device 400. The signature may for example be computed using a private key of the authentication server 300 whose public key is trusted by the second communications device 400 and can be used in the verification. Alternatively, a secure communication protocol such as the Transport Layer Security (TLS) protocol might be used to protect the communication between the authentication server 300 and the second communications device 400, which might prevent the above-disclosed attack.

Embodiments applicable for both the first communications device 200 and the authentication server 300 will now be disclosed.

There could be different examples of shared secrets. Particularly, according to an embodiment the shared secret is an Extended Maser Session key (EMSK).

In some aspects the shared secret derived from the authentication and key agreement protocol typically has a limited life-time and must then be renewed, either by performing a completely new run of the authentication and key agreement protocol or a shorter version thereof for resuming the session in which the shared secrets are typically reused. Particularly, according to an embodiment the shared secret has a limited life-time and becomes obsolete upon expiration of the limited life-time.

There could be different examples of network access identities. In some aspects the identity used for the network attachment in the first communications device 200 is a 3GPP identity. The authentication server 300 might in then be connected to a HSS 140 that maintains subscriber data and provides authentication vectors to the authentication server 300 for use in the authentication and key agreement protocol. Particularly, according to an embodiment the network access identity is a 3GPP identity of the first communications device 200.

There could be different examples of authentication and key agreement protocols. Particularly, according to an embodiment the authentication and key agreement protocol is an Extensible Authentication Protocol (EAP). In more detail, in the EAP protocol different mechanisms, such as EAP-TLS, EAP-PSK, and EAP-AKA, could be used for the authentication and key agreement (where AKA is short for Authentication and key Agreement). EAP-AKA might be used when the network access identity is a 3GPP identity and the 3GPP AKA algorithm is re-used for the authentication and key agreement. The EAP protocol specifies two shared secrets; EAP Master Session Key (EAP-MSK) and EAP Extended Master Session Key (EAP-EMSK). The EAP-MSK can be used as the shared secret when deriving network traffic encryption and integrity protection keys. The EAP-EMSK can be used as the application level shared key. In the case of the EAP protocol being used the device identifier may be the value of the EAP-identity response message.

As disclosed above, the access token could comprise an application identifier (AppID) of an application run by the first communications device 200. Particularly, according to an embodiment the secure communication is for an application run by the first communications device 200, and the application level shared key is unique for this application. That is, in case the first communications device 200 runs two or more applications, each with its own AppID, each application could have its own application level shared key. Therefore, several different application level shared keys (such as one for each AppID) can be computed between the second communications device 400 and the first communications device 200.

Figure 4:
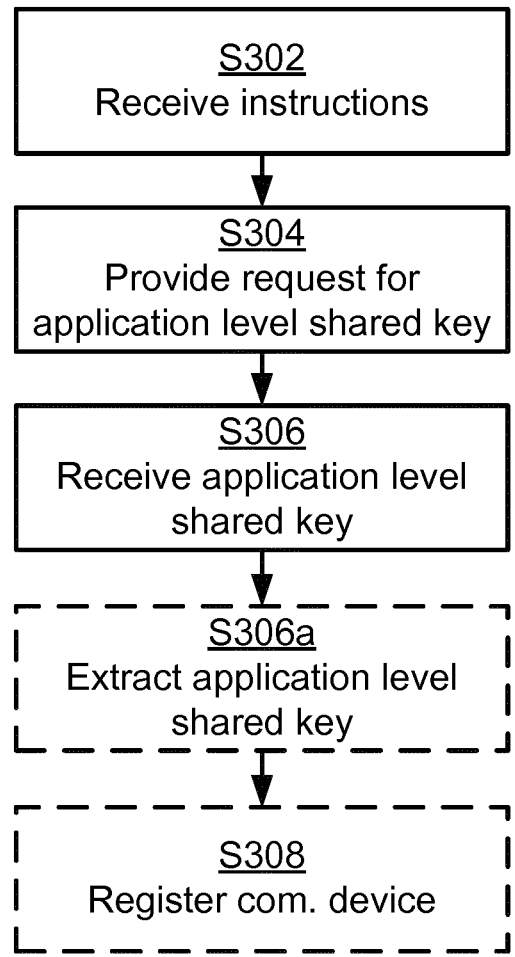

Reference is now made to FIG. 4 illustrating a method for enabling secure communication between a first communications device 200 and a second communications device 400 as performed by the second communications device 400 according to an embodiment.

As disclosed above, the first communications device 200 might instruct the second communications device 400 to retrieve the application level shared key from the authentication server 300 as part of the signalling with the second communications device 400 to establish the secure communication to the first communications device 200. Therefore, the second communications device 400 is configured to perform step S302:

S302: The second communications device 400 receives instructions from the first communications device 200 to retrieve an application level shared key from the authentication server 300 when establishing the secure communication with the first communications device 200. The shared key is to be used for the secure communication between the first communications device 200 and the second communications device 400.

Upon having received the instructions the second communications device 400 provides a corresponding request to the authentication server 300. Particularly, the second communications device 400 is configured to perform step S304:

S304: The second communications device 400 provides a request for the application level shared key from the authentication server 300.

It is assumed that the authentication server 300 provides the second communications device 400 with the application level shared key. Particularly, the second communications device 400 is configured to perform step S306:

S306: The second communications device 400 receives the application level shared key from the authentication server 300.

Embodiments relating to further details of enabling secure communication between a first communications device 200 and a second communications device 400 as performed by the second communications device 400 will now be disclosed.

As disclosed above, according to an embodiment the instructions comprise an access token. The access token at least comprises a session identifier. The access token is provided to the authentication server 300 in the request.

Upon receiving the access token the second communications device 400 might parse the access token to extract which authentication server 300 to contact. Particularly, according to an embodiment the access token comprises information about which authentication server 300 to provide the request to. This information may be extracted from the session identifier as provided in the access token. For example, the session identifier might include the fully qualified domain name of the authentication server 300.

The second communications device 400 might then verify that the authentication server 300 is among the set of authentication servers that it trusts. Then, according to an embodiment the request only is provided upon having verified that the second communications device 400 has a trust relation with the authentication server 300.

In some aspects the request could comprises the access token, an identifier of the second communications device 400, and the public key or certificate of the second communications device 400. Particularly, according to an embodiment the request to the authentication server 300 comprises a public key or certificate of the second communications device 400. The access token comprises a hash of the public key or certificate as determined by the first communications device 200.

As disclosed above, in some aspects the authentication server 300 encapsulates the application level shared key. In some aspects the second communications device 400 is therefore configured to decrypt the encapsulated application level shared key using its private key. Particularly, according to an embodiment the application level shared key is received as an encapsulated application level shared key and the second communications device 400 is configured to perform (optional) step S306a:

S306a: The second communications device 400 extracts the application level shared key by decrypting the encapsulated application level shared key using a private key of the second communications device 400.

In some aspects step S306a is part of step S306.

The first communications device 200 could provide an identifier of the first communications device 200 to the second communications device 400 as part of running the protocol for establishing secure communication. In this respect the second communications device 400 could be configured with a list of trusted identifiers of first communications device 200 that it accepts. To prevent impersonation attacks it could thus be necessary for the second communications device 400 to securely identify the first communications device 200. A rogue first communications device may try to impersonate another first communications device 200 by using an identifier of said another first communications device 200 when establishing the secure communication. The authentication server 300 might therefore provide proof to the second communications device 400 that the application level shared key is linked to the identifier used by the first communications device 200. This can be achieved by the authentication server 300 not only signing the encapsulated application level shared key but also including the identifier in the signature. In this way the second communications device 400 is enabled to validate the identifier received from the first communications device 200. If a secure communication protocol, such as TLS, is used, instead the identifier could be included with the encapsulated application level shared key in the response message from the authentication server 300.

For simplicity the network access identifier of the first communications device 200 might be used as identifier also at the application level. At least this could be the identifier sent by the authentication server 300 to the second communications device 400. In this way the authentication server 300 only needs to know about network access identifiers. If the identifier sent by the first communications device 200 to the second communications device 400 is not the network access identifier, the second communications device 400 needs to have a mapping between the network access identifier received from the authentication server 300 and the identifier received from the first communications device 200.

As disclosed above, in some aspects the application level shared key is used as a shared secret in the protocol used by the first communications device and the second communications device 400 to establish secure communication. Hence, according to an embodiment the second communications device 400 is configured to perform (optional) step S308:

S308: The second communications device 400 registers the first communications device 200 with the second communications device 400 once having established the secure communication with the first communications device 200 using the application level shared key.

As disclosed above, as a non-limiting example, any of DTLS-PSK, TLS-PSK or OSCOAP can be used during the secure communication between the first communications device 200 and the second communications device 400.

Embodiments applicable for the first communications device 200, the authentication server 300, and the second communications device 400 will now be disclosed.

There could be different types of application level shared keys. Particularly, according to an embodiment the application level shared key is a Pre-Shared Key (PSK).

According to an embodiment the communication between the first communications device 200 and the second communications device 400 is application layer communication. Thus, in some aspects the embodiments provided herein are for enabling secure application level communication between the first communications device 200 and the second communications device 400.

The following definitions and computations are applicable in embodiments of using 3GPP identities with EAP-AKA The value of the session identifier (B-TID) could be generated in format of network access identifier by taking the base64 encoded random challenge (RAND) value (from the AKA session of the network attachment) and the name of the authentication server 300, i.e., base64encode(RAND) @AAA_server_domain_name. This is the same format as used in GBA. The first communications device 200 stores the RAND value from the network attachment procedure. The first communications device 200 has knowledge of the name of the authentication server 300 from configurations made by the MS 170. The first communications device 200 can then construct the value of the session identifier when needed.

The value of the application level shared key (hereinafter PSK) could be computed as follows:

$$PSK=KDF(EAP\text{-}EMSK,RAND,EAP\text{-}Identity,DS\ Identifier,AppID),$$

In the above expression for PSK, KDF is a key derivation function, e.g. HMAC-SHA-256(key, string) that can be used where the first parameter of the KDF is the key and the string is formed by concatenating the following parameters in that order: EAP-EMSK is the extended master session key agreed in the EAP-AKA protocol between the first communications device 200 and the authentication server 300, RAND is the random challenge in the AKA protocol run as part of EAP-AKA, EAP-Identity is the identity of the first communications device 200 as sent in the EAP-AKA protocol, DS Identifier is the identifier of the second communications device 400, which could be the fully qualified domain name of the second communications device 400, and AppID is an application identifier. This identifier is part of the access token.

The value of the key (hereinafter EMSK') derived from the shared secret (hereinafter EMSK) could be computed as follows:

EMSK'=KDF(EAP-EMSK,RAND,EAP-Identity,'Access token')

In the above expression for EMSK' all parameters are the same as for computing the PSK, except for the last entries where the DS Identifier and AppID are replaced by the string 'Access token'.

As described above, the shared secret (EMSK) could have a limited life-time and must then be renewed. This life-time is also an upper limit for the life-time of B-TID, PSK, and EMSK'. As soon as EMSK is renewed then new values for B-TID, PSK, and EMSK' may be derived. The second communications device 400 may obtain information about the life-time of EMSK from the authentication server 400. Such information could be delivered together with the encapsulated application level shared key.

Figure 5:
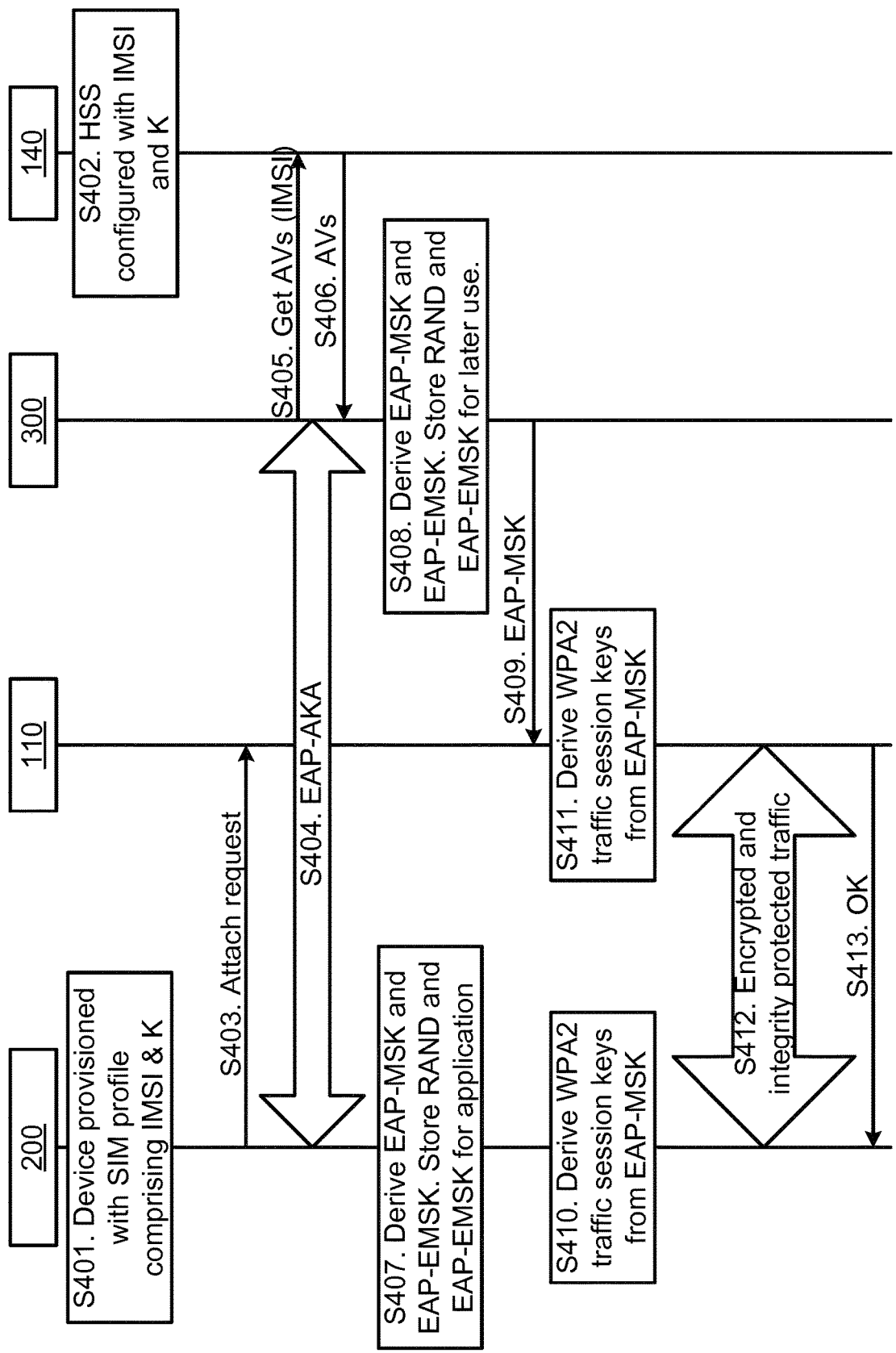
FIGS. 5, 6, 7, and 8 are signalling diagrams according to embodiments.

FIG. 5 is a signalling diagram of a network attachment procedure according to an embodiment.

S401: The first communications device 200 is provisioned with a subscriber identity module (SIM) profile comprising an International Mobile Subscriber Identity (IMSI) and a shared secret (K).

S402: The HSS 140 of the network 100 is configured with the IMSI and the shared secret K of the first communications device 200.

S403: The first communications device 200 makes an attach request to the network node no of the network 100.

S404: The attach request causes an EAP-AKA session to be established between the first communications device 200 and the authentication server 300.

S405: The authentication server 300 requests authentication vectors (AVs) from the HSS 140 for the first communications device 200 providing the IMSI of the first communications device 200 to the HSS 140.

S406: The HSS 140 provides the AVs for the first communications device 200 to the authentication server 300. An authentication vector is used in the EAP-AKA protocol.

S407: The first communications device 200 derives the EAP-MSK and EAP-EMSK and stores the random challenge RAND and EAP-EMSK for later use by an application.

S408: The authentication server 300 derives the EAP-MSK and EAP-EMSK and stores the random challenge RAND and EAP-EMSK for later use.

S409: The authentication server 300 provides the EAP-MSK to the network node 110.

S410: The first communications device 200 derives Wi-Fi Protected Access 2 (WPA2) keys from the EAP-MSK.

S411: The network node no derives Wi-Fi Protected Access 2 (WPA2) keys from the EAP-MSK.

S412: Encrypted and integrity protected traffic is established between the first communications device 200 and the network node no using the respective WPA2 keys.

S413: Once the encrypted and integrity protected traffic has been established the network node 110 signals an OK to the first communications device 200.

Figure 6:
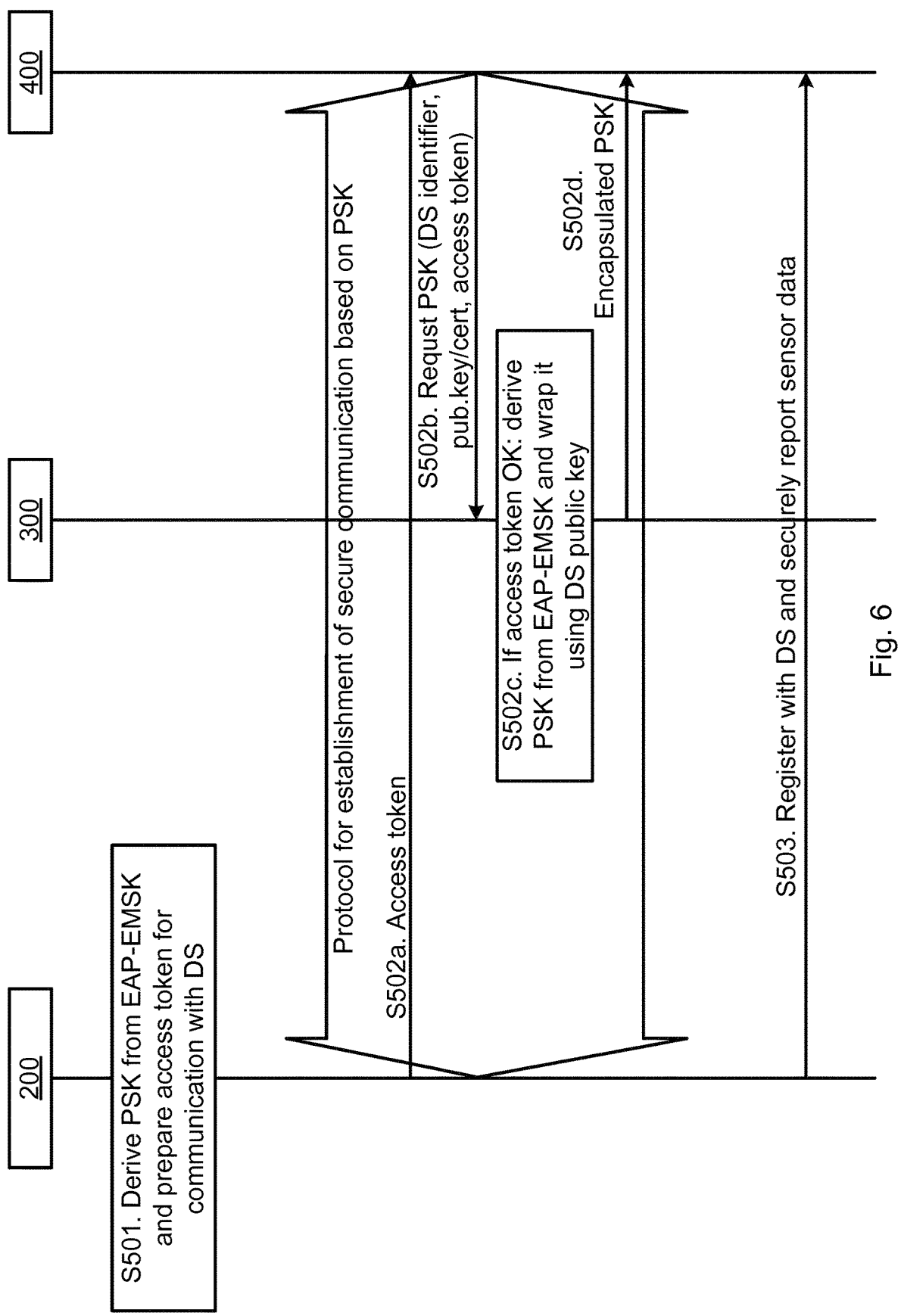

FIG. 6 is a signalling diagram of establishing secure communications at the application layer between the first communications device 200 and the second communications device 400 according to an embodiment. In FIG. 6 the second communications device 400 is represented by a DS.

S501: The first communications device 200 derives the PSK from the EAP-EMSK and prepares the access token for communications with the second communications device 400.

Steps S502a-S502d according to a protocol for establishment of secure communication based on PSK are then performed:

S502a: The first communications device 200 provides the access token to the second communications device 400.

S502b: The second communications device 400 requests the PSK from the authentication server by providing an identifier of the second communications device 400, a public key or certificate of the second communications device 400 and the access token to the authentication server 300.

S502c: The authentication server 300 verifies the access token and checks it against a database. If all checks and verifications are ok, then the authentication server 300 derives the PSK from the EAP-EMSK and wraps the PSK (by means of a Key Wrap construction) using the public key or certificate of the second communications device 400 so as to form an encapsulated PSK.

S502d: The authentication server 300 provides the second communications device 400 with the encapsulated PSK.

S503: The first communications device 200 registers with the second communications device 400.

Figure 7:
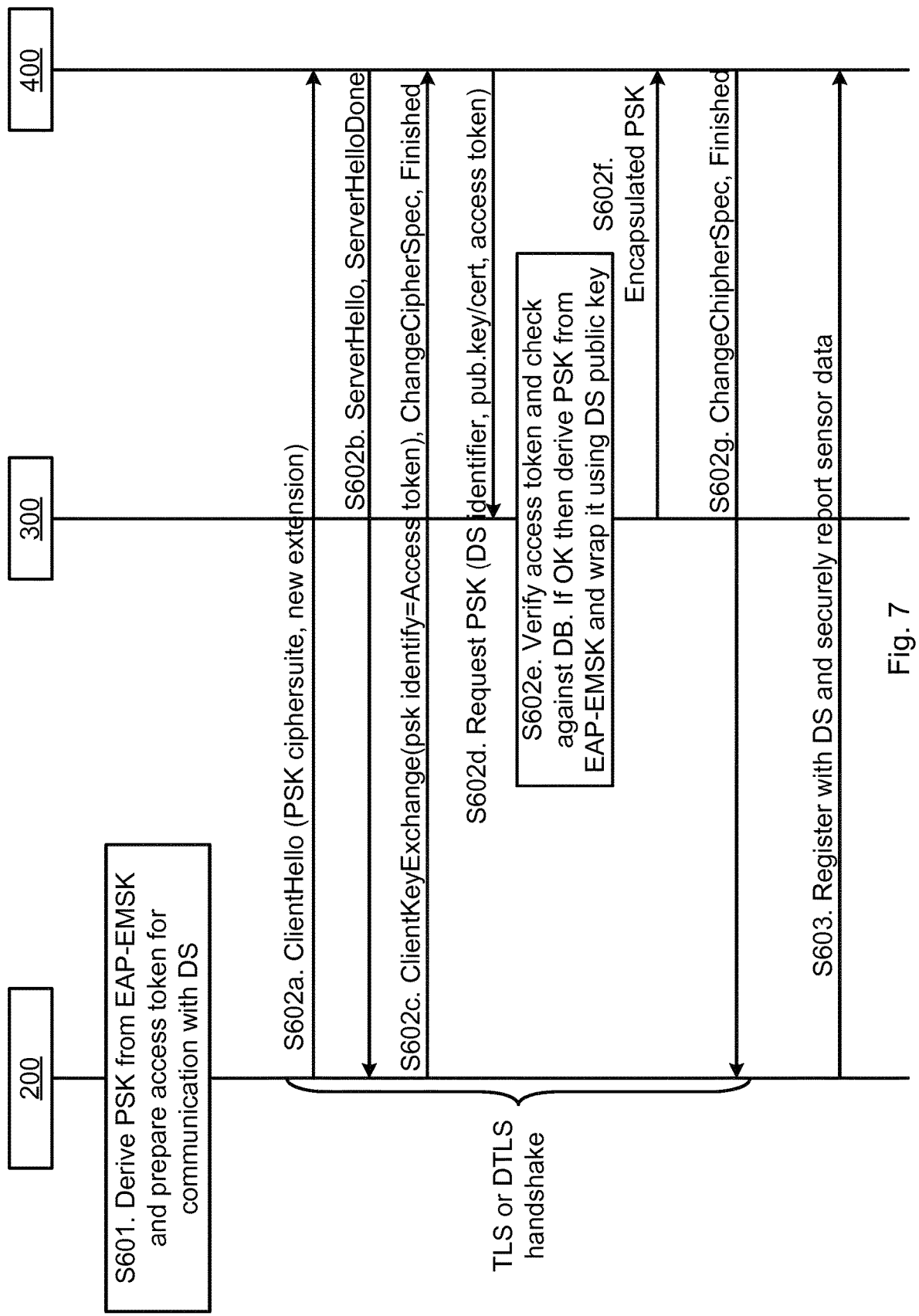

A first particular embodiment for establishing secure communications at the application layer between the first communications device 200 and the second communications device 400 based on at least some of the above disclosed embodiments will now be disclosed in detail with reference to the signalling diagram of FIG. 7.

In this embodiment the secure communication between the first communications device 200 and the second communications device 400 is based on TLS-PSK or DTLS-PSK. In this embodiment the access token is transmitted from the first communications device 200 (acting as a TLS client) to the second communications device 400 (acting as a TLS server) as part of the psk_identity field in TLS-ClientKeyExchange message. Upon receiving this message the second communications device 400 may request the PSK from the authentication server 300 according as disclosed above and may then continue and complete the TLS or DTLS handshake. A TLS extension in the ClientHello message may be used to instruct the second communications device 400 that it needs to contact an authentication server 300 to fetch the PSK and that the psk_identity field provides the needed information. Alternatively, the psk_identity field starts with a string that indicates to the second communications device 400 that it needs to pick up the PSK from another authentication server. After the string, still as part of the psk_identity, follows the access token. This embodiment is valid also for Diffie-Hellman key exchange authenticated using PSK, which provides perfect forward secrecy. Both schemes make use of the psk_identity field in the client key exchange. In FIG. 7 the second communications device 400 is represented by a DS.

S601: The first communications device 200 derives the PSK from the EAP-EMSK and prepares the access token for communications with the second communications device 400.

Steps S602a-S502g according to TLS or DTLS handshake messages are then performed:

S602a: The first communications device 200 contacts the second communications device 400 by sending a message ClientHello (PSK ciphersuite, new extension) to the second communications device 400.

S602b: The second communications device 400 responds with a message ServerHello, ServerHelloDone to the first communications device 200.

S602c: The first communications device 200 sends the access token to the second communications device 400 by sending a message ClientKeyExchange(psk identify=Access token), ChangeCipherSpec, Finished to the second communications device 400.

S602d: The second communications device 400 requests the PSK from the authentication server 300 by providing an identifier of the second communications device 400, a public key or certificate of the second communications device 400 and the access token to the authentication server 300.

S602e: The authentication server 300 verifies the access token and checks it against a database. If all checks and verifications are ok, then the authentication server 300 derives the PSK from the EAP-EMSK and wraps the PSK (by means of a Key Wrap construction) using the public key or certificate of the second communications device 400 so as to form an encapsulated PSK.

S602f: The authentication server 300 provides the second communications device 400 with the encapsulated PSK.

S602g: The second communications device 400 informs the first communications device 200 that the second communications device 400 has successfully obtained the PSK by sending a message ChangeChipherSpec, Finished to the first communications device 200.

S603: The first communications device 200 registers with the second communications device 400.

Figure 8:
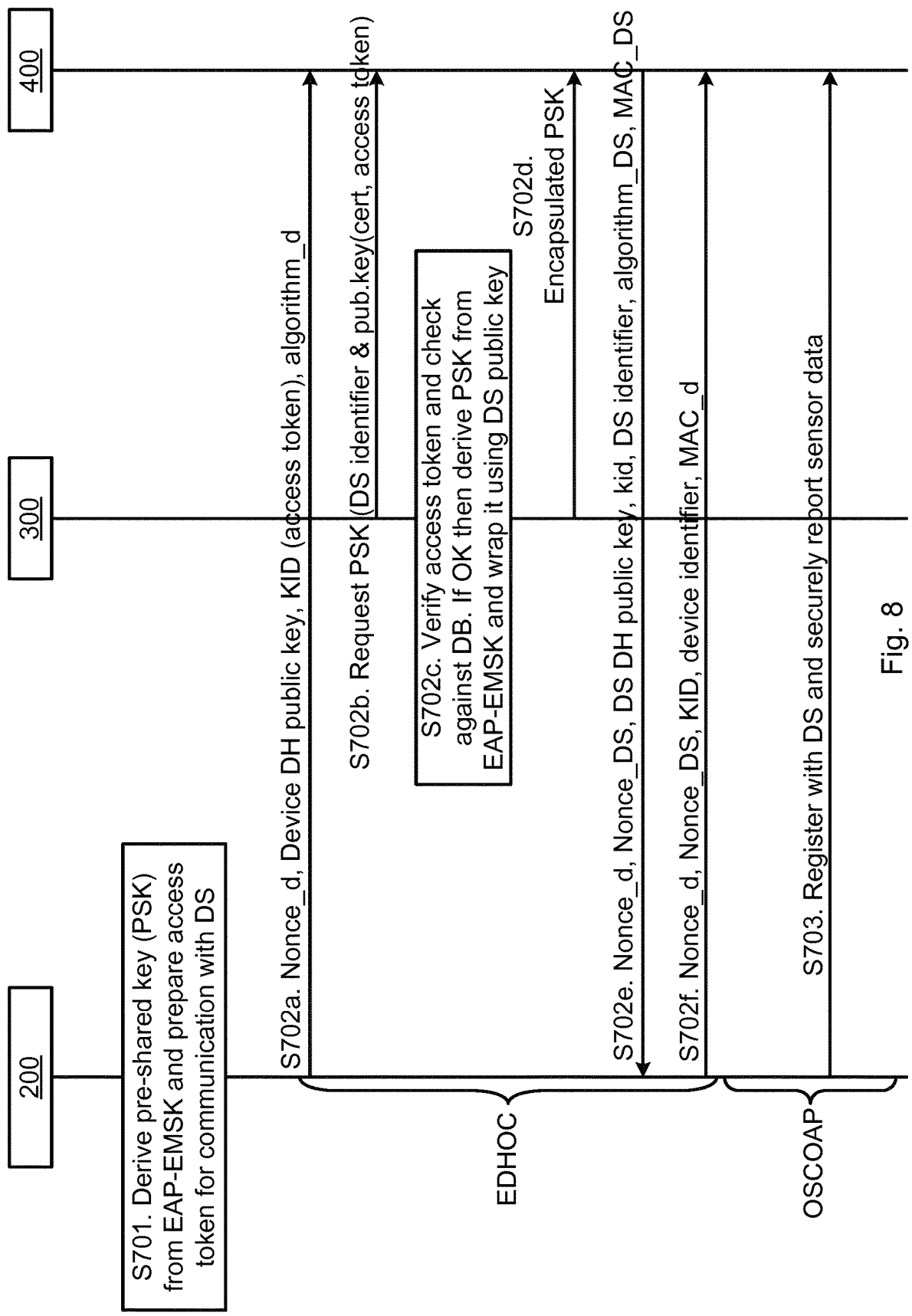

A second particular embodiment for establishing secure communications at the application layer between the first communications device 200 and the second communications device 400 based on at least some of the above disclosed embodiments will now be disclosed in detail with reference to the signalling diagram of FIG. 8.

In this embodiment the secure communication between the first communications device 200 and the second communications device 400 is based on protecting individual messages on the application layer. CoAP is used and message exchanges are protected using the Concise Binary Object Representation (CBOR) Object Signing and Encryption (COSE) format, referred to Object Security of CoAP (OSCOAP). OSCOAP provides end-to-end encryption, integrity and replay protection to CoAP payload, options, and header fields, as well as a secure binding between CoAP request and response messages. The keys used for the protection keys are session keys established using a key exchange protocol. One such protocol specified for use with CoAP is Ephemeral Diffie-Hellman Over COSE (EDHOC) which specifies an authenticated Diffie-Hellman key exchange with ephemeral keys. Here one variant of EDHOC is used where authentication is obtained using a pre-shared secret (PSK) and the PSK derived from the EMSK is utilized. EDHOC key exchange messages are encoded with CBOR using the COSE format. The key identifier (KID) is used to transfer the access token from the first communications device 200 to the second communications device 400 such that the second communications device 400 can request the PSK from the authentication server 400. Similar to the description for DTLS, the KID may here start with some string indicating to the second communications device 400 that PSK need to be picked up at an authentication server 300 according to the access token to follow. To save bits the access token part of the KID may be left out in messages 2 and 3 in EDHOC. In FIG. 8 the second communications device 400 is represented by a DS.

S701: The first communications device 200 derives the PSK from the EAP-EMSK and prepares the access token for communications with the second communications device 400.

Steps S702a-S702f according to EDHOC handshake messages are then performed:

S702a: The first communications device 200 contacts the second communications device 400 by sending a message Nonce_d. Device DH public key, KID (access token), algorithm_d to the second communications device 400.

S702b: The second communications device 400 requests the PSK from the authentication server 300 by providing an identifier of the second communications device 400, a public key or certificate of the second communications device 400 and the access token to the authentication server 300.

S702c: The authentication server 300 verifies the access token and checks it against a database. If all checks and verifications are ok, then the authentication server 300 derives the PSK from the EAP-EMSK and wraps the PSK (by means of a Key Wrap construction) using the public key or certificate of the second communications device 400 so as to form an encapsulated PSK.

S702d: The authentication server 300 provides the second communications device 400 with the encapsulated PSK.

S702e: The second communications device 400 informs the first communications device 200 that the second communications device 400 has successfully obtained the PSK by sending a message Nonce_d, Nonce_DS, DS DH public key, KID, DS identifier, algorithm_DS, MAC_DS to the first communications device 200.

S702f: The first communications device 200 responds to the second communications device 400 by sending a message Nonce_d, Nonce_DS, KID, device identifier, MAC_d to the second communications device 400.

Step S703 protected using OSCOAP is then performed:

S703: The first communications device 200 registers with the second communications device 400

In summary, according to at least some of the above disclosed embodiments the network access identity of the first communications device 200 is used to establish secure communication at the application layer. A shared secret, EMSK, established between the first communications device 200 and the authentication server 300 during network attachment, is used to derive an application level shared key, PSK, for secure application level communication between the first communications device 200 and the second communications device 400. The shared secret is established through an authentication and key agreement protocol run as part of network attachment and using the network access identity.

Figure 9:
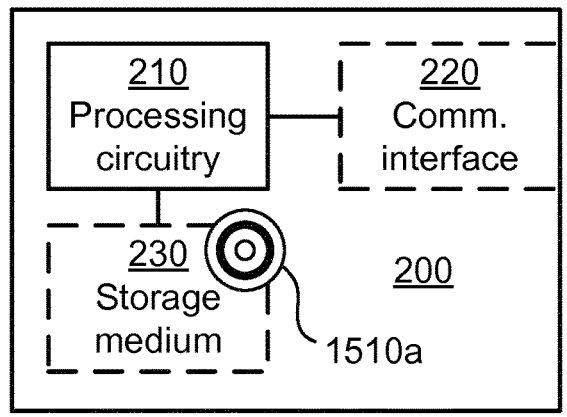
FIG. 9 is a schematic diagram showing functional units of a first communications device according to an embodiment.

FIG. 9 schematically illustrates, in terms of a number of functional units, the components of a first communications device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the first communications device 200 to perform a set of operations, or steps, S102-S108, as disclosed above. For example, the storage medium 230 may store the set of operations, and the processing circuitry 210 may be configured to retrieve the set of operations from the storage medium 230 to cause the first communications device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first communications device 200 may further comprise a communications interface 220 for communications with other entities, devices, functions, nodes, and servers of the communications network 100. As such the communications interface 220 may comprise one or more transmitters and receivers, comprising analogue and digital components.

The processing circuitry 210 controls the general operation of the first communications device 200 e.g. by sending data and control signals to the communications interface 220 and the storage medium 230, by receiving data and reports from the communications interface 220, and by retrieving data and instructions from the storage medium 230. Other components, as well as the related functionality, of the first communications device 200 are omitted in order not to obscure the concepts presented herein.

Figure 10:
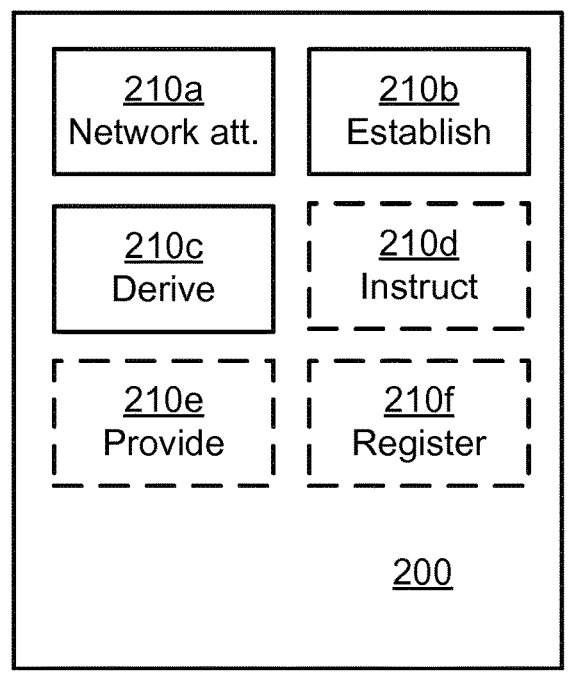
FIG. 10 is a schematic diagram showing functional modules of a first communications device according to an embodiment.

FIG. 10 schematically illustrates, in terms of a number of functional modules, the components of a first communications device 200 according to an embodiment. The first communications device 200 of FIG. 10 comprises a number of functional modules; a network attachment module 210a configured to perform step S102, an establish module 210b configured to perform step S102a, and a derive module 210c configured to perform step S104. The first communications device 200 of FIG. 10 may further comprise a number of optional functional modules, such as any of an instruct module 210d configured to perform step S106, a provide module 210e configured to perform step S106a, and a register module 210f configured to perform step S108. In general terms, each functional module 210a-210f may be implemented in hardware or in software. Preferably, one or more or all functional modules 210a-210f may be implemented by the processing circuitry 210, possibly in cooperation with the communications interface 220 and the storage medium 230. The processing circuitry 210 may thus be arranged to from the storage medium 230 fetch instructions as provided by a functional module 210a-210f and to execute these instructions, thereby performing any steps of the first communications device 200 as disclosed herein.

There could be different types of first communications devices 200. In some aspects the first communications device 200 is any of a terminal device, wireless device, mobile station, mobile phone, handset, wireless local loop phone, user equipment (UE), smartphone, laptop computer, tablet computer, network equipped sensor, network equipped vehicle, or a so-called Internet of Things (IoT) device.

Figure 11:
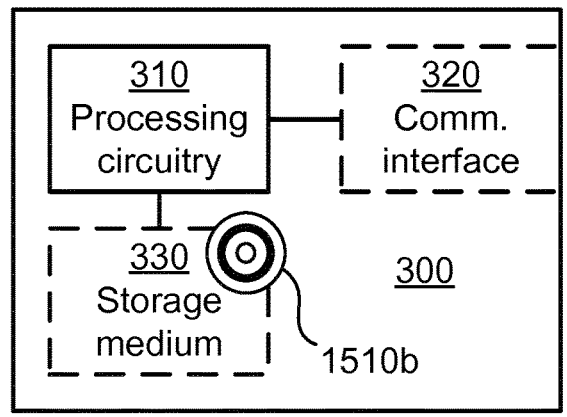
FIG. 11 is a schematic diagram showing functional units of an authentication server according to an embodiment.

FIG. 11 schematically illustrates, in terms of a number of functional units, the components of an authentication server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the authentication server 300 to perform a set of operations, or steps, S202-S208, as disclosed above. For example, the storage medium 330 may store the set of operations, and the processing circuitry 310 may be configured to retrieve the set of operations from the storage medium 330 to cause the authentication server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The authentication server 300 may further comprise a communications interface 320 for communications with other entities, devices, functions, nodes, and servers of the communications network 100. As such the communications interface 320 may comprise one or more transmitters and receivers, comprising analogue and digital components.

The processing circuitry 310 controls the general operation of the authentication server 300 e.g. by sending data and control signals to the communications interface 320 and the storage medium 330, by receiving data and reports from the communications interface 320, and by retrieving data and instructions from the storage medium 330. Other components, as well as the related functionality, of the authentication server 300 are omitted in order not to obscure the concepts presented herein.

Figure 12:
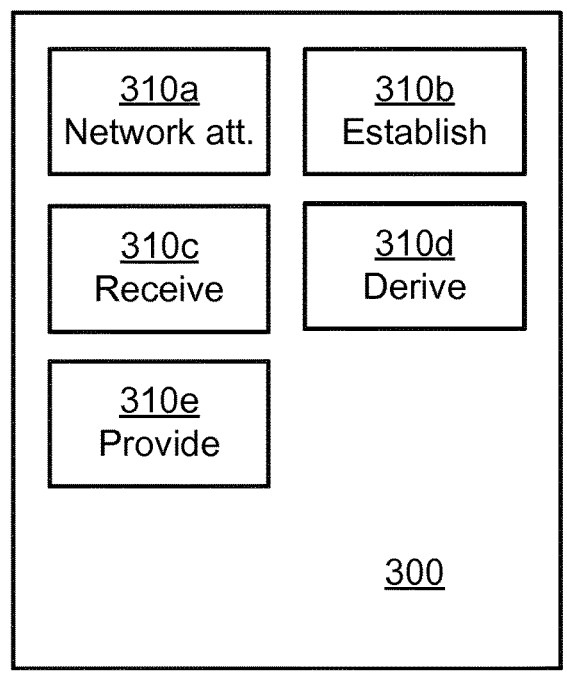
FIG. 12 is a schematic diagram showing functional modules of an authentication server according to an embodiment.

FIG. 12 schematically illustrates, in terms of a number of functional modules, the components of an authentication server 300 according to an embodiment. The authentication server 300 of FIG. 12 comprises a number of functional modules; a network attachment module 310a configured to perform step S202, an establish module 210b configured to perform step S202b, a receive module 310c configured to perform step S204, a derive module 310d configured to perform step S206, and a provide module 310e configured to perform step S208. The authentication server 300 of FIG. 12 may further comprise a number of optional functional modules. In general terms, each functional module 310a-310e may be implemented in hardware or in software. Preferably, one or more or all functional modules 310a-310e may be implemented by the processing circuitry 310, possibly in cooperation with the communications interface 320 and the storage medium 330. The processing circuitry 310 may thus be arranged to from the storage medium 330 fetch instructions as provided by a functional module 310a-310e and to execute these instructions, thereby performing any steps of the authentication server 300 as disclosed herein.

There could be different types of authentication servers 300. As disclosed above, in some aspects the authentication server 300 is an AAA server.

Figure 13:
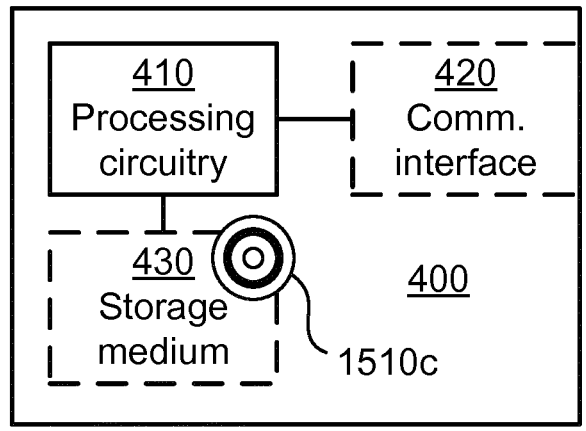
FIG. 13 is a schematic diagram showing functional units of a second communications device according to an embodiment.

FIG. 13 schematically illustrates, in terms of a number of functional units, the components of a second communications device 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1510c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the second communications device 400 to perform a set of operations, or steps, S302-S308, as disclosed above. For example, the storage medium 430 may store the set of operations, and the processing circuitry 410 may be configured to retrieve the set of operations from the storage medium 430 to cause the second communications device 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The second communications device 400 may further comprise a communications interface 420 for communications with other entities, devices, functions, nodes, and servers of the communications network 100. As such the communications interface 420 may comprise one or more transmitters and receivers, comprising analogue and digital components.

The processing circuitry 410 controls the general operation of the second communications device 400 e.g. by sending data and control signals to the communications interface 420 and the storage medium 430, by receiving data and reports from the communications interface 420, and by retrieving data and instructions from the storage medium 430. Other components, as well as the related functionality, of the second communications device 400 are omitted in order not to obscure the concepts presented herein.

Figure 14:
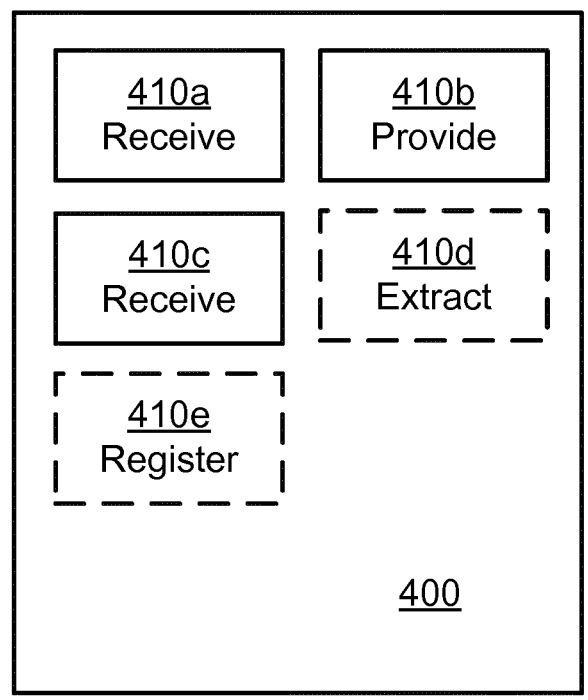
FIG. 14 is a schematic diagram showing functional modules of a second communications device according to an embodiment.

FIG. 14 schematically illustrates, in terms of a number of functional modules, the components of a second communications device 400 according to an embodiment. The second communications device 400 of FIG. 14 comprises a number of functional modules; a receive module 410a configured to perform step S302, a provide module 410b configured to perform step S304, and a receive module 410c configured to perform step S306. The second communications device 400 of FIG. 14 may further comprise a number of optional functional modules, such as any of an extract module 410d configured to perform step S106a, and a register module 410e configured to perform step S38. In general terms, each functional module 410a-410e may be implemented in hardware or in software. Preferably, one or more or all functional modules 410a-410e may be implemented by the processing circuitry 410, possibly in cooperation with the communications interface 420 and the storage medium 430. The processing circuitry 410 may thus be arranged to from the storage medium 430 fetch instructions as provided by a functional module 410a-410e and to execute these instructions, thereby performing any steps of the second communications device 400 as disclosed herein.

There could be different types of second communications devices 400. As disclosed above, in some aspects the second communications device 400 is a data server. However, in other aspects the second communications device 400 is any of a terminal device, wireless device, mobile station, mobile phone, handset, wireless local loop phone, user equipment (UE), smartphone, laptop computer, tablet computer, network equipped sensor, network equipped vehicle, or a so-called Internet of Things (IoT) device.

Any of the herein disclosed functions, nodes, and devices (such as any of the first communications device 200, the authentication server 300, and the second communications device 400) may be provided as a respective standalone device or as a part of at least one further device. Alternatively, functionality of any of the herein disclosed functions, nodes, and devices may be distributed between at least two physical devices, or nodes. These at least two nodes, or devices, may either be part of the same network part or may be spread between at least two such network parts.

Thus, a first portion of the instructions performed by any of the herein disclosed functions, nodes, and devices may be executed in a respective first device, and a second portion of the of the instructions performed by any of the herein disclosed functions, nodes, and devices may be executed in a respective second device; the herein disclosed embodiments are not limited to any particular number of devices on which the instructions performed by any of the herein disclosed functions, nodes, and devices may be executed. Hence, the methods according to the herein disclosed embodiments are suitable to be performed by functions, nodes, and devices residing in a cloud computational environment. Therefore, although a single processing circuitry 210, 310, 410 is illustrated in FIGS. 9, 11, 13 the processing circuitry 210, 310, 410 may be distributed among a plurality of devices, or nodes. The same applies to the functional modules of FIG. 10, 12, 14 and the computer programs 1520a, 1520b, 1520c of FIG. 15.

Figure 1:
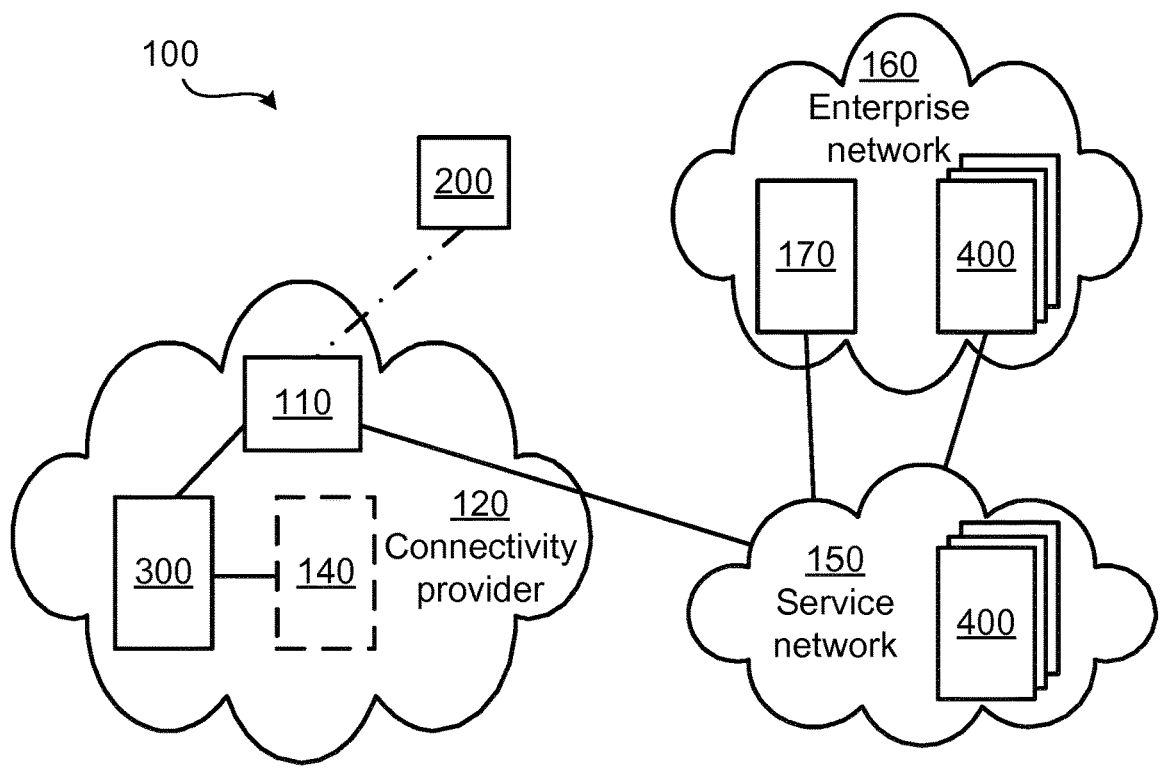
FIG. 1 is a schematic diagram illustrating a communication network according to embodiments.
Figure 15:
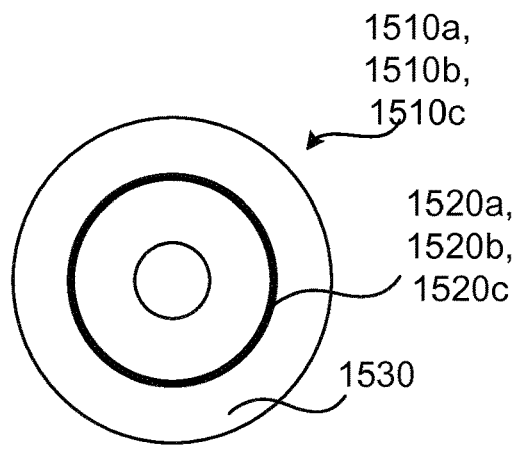
FIG. 15 shows one example of a computer program product comprising computer readable means according to an embodiment.

FIG. 15 shows one example of a computer program product 1510a, 1510b, 1510c comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the first communications device 200 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the authentication server 300 as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any steps of the second communications device 400 as herein disclosed.

In the example of FIG. 15, the computer program product 1510a, 1510b, 1510c is illustrated as an optical disc, such as a CD (compact disc) or a DVD (digital versatile disc) or a Blu-Ray disc. The computer program product 1510a, 1510b, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 1520c is here schematically shown as a track on the depicted optical disk, the computer program 1520a, 1520b, 1520c can be stored in any way which is suitable for the computer program product 1510a, 1510b, 1510c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling secure communication between a first communications device and a second communications device, the method comprising the first communications device:
   performing a network attachment procedure with an authentication server in response to a request from the second communications device;
   establishing, during the network attachment procedure, a shared secret between the first communications device and the authentication server, wherein the shared secret is established by running an authentication and key agreement protocol as part of the network attachment procedure with a network access identity of the first communications device as input; and
   deriving an application level shared key for the first communications device from the shared secret, wherein the application level shared key is to be used for secure communication between the first communications device and the second communications device;
   the request from the second communications device comprising an access token;
   the request comprising one of a public key and certificate of the first communications device;
   the access token comprising a hash of the one of the public key and certificate as determined by the first communications device; and
   the application level shared key for the first communications device only being derived when there is a match between the hash and a hash, determined by the authentication server, of the one of the public key and certificate comprised in the access token.

2. The method of claim 1, further comprising instructing the second communications device to retrieve the application level shared key from the authentication server when establishing the secure communication with the second communications device.

3. The method of claim 2:
   further comprising registering with the second communications device once having established secure communication with the second communications device;
   wherein the application level shared key is used in establishing the secure communication.

4. The method of claim 3, wherein Datagram Transport Layer Security Pre-Shared Key (DTLS-PSK), Transport Layer Security Pre-Shared Key (TLS-PSK), or Object Security for Constrained Application Protocol (OSCOAP) is used during the secure communication between the first communications device and the second communications device.

5. The method of claim 1, wherein the session identifier is a bootstrapping transaction identifier(B-TID).

6. A method for enabling secure communication between a first communications device and a second communications device, the method comprising an authentication server:
   performing a network attachment procedure with the first communications device;
   establishing, during the network attachment procedure, a shared secret between the authentication server and the first communications device, wherein the shared secret is established by running an authentication and key agreement protocol as part of the network attachment procedure with a network access identity of the first communications device as input;
   receiving a request from the second communications device for an application level shared key, wherein the application level shared key is to be used for secure communication between the first communications device and the second communications device;
   deriving the application level shared key for the first communications device from the shared secret;
   providing the application level shared key to the second communications device;
   the request from the second communications device comprising an access token;
   the request from the second communications device comprising one of a public key and certificate of the second communications device;
   the access token comprising a hash of the one of the public key and certificate as determined by the first communications device; and
   the application level shared key for the first communications device only being derived when there is a match between the hash and a hash, determined by the authentication server, of the one of the public key and certificate comprised in the access token.

7. The method of claim 6:
   wherein the request comprises an access token, the access token comprising a session identifier; and
   wherein the session identifier is used to determine which shared secret to use when deriving the application level shared key and for which first communications device to derive the application level shared key.

8. The method of claim 7, wherein the access token is validated by a shared key, the application level shared key being derived by the authentication server from the shared secret.

9. The method of claim 8:
   wherein the access token comprises a Message Authentication Code (MAC); and
   wherein the access token is validated by the authentication server verifying the MAC using the application level shared key.

10. The method of claim 6, wherein the application level shared key is encapsulated before being provided to the second communications device.

11. The method of claim 6, wherein the shared secret has a limited life-time and becomes obsolete upon expiration of the limited life-time.

12. The method claim 6, wherein the authentication and key agreement protocol is an Extensible Authentication Protocol (EAP).

13. The method claim 6, wherein the shared secret is an Extended Master Session key (EMSK).

14. The method of claim 6, wherein the network access identity is a third generation partnership project (3GPP) identity of the first communications device.

15. The method of claim 6:
   wherein the secure communication is for an application run by the first communications device; and
   wherein the application level shared key is unique for the application.

16. A method for enabling secure communication between a first communications device and a second communications device, the method comprising the second communications device:

receiving instructions from the first communications device to retrieve an application level shared key from an authentication server when establishing the secure communication with the first communications device, wherein the application level shared key is to be used for the secure communication between the first communications device and the second communications device;

providing a request for the application level shared key from the authentication server;

receiving the application level shared key from the authentication server;

the instructions comprising an access token;

the request from the authentication server comprising one of a public key and certificate of the second communications device;

the access token comprising a session identifier, information about which authentication server to provide the request to and a hash of the one of the public key and certificate as determined by the first communications device; and the access token being provided to the authentication server in the request.

17. The method of claim 16, wherein the request only is provided upon having verified that the second communications device has a trust relation with the authentication server.

18. The method of claim 16:
wherein the application level shared key is received as an encapsulated application level shared key;
wherein the method further comprises extracting the application level shared key by decrypting the encapsulated application level shared key using a private key of the second communications device.

19. The method of claim 16, further comprising registering the first communications device with the second communications device once having established the secure communication with the first communications device using the application level shared key.

20. The method of claim 16, wherein the application level shared key is a Pre-Shared Key (PSK).

21. The method of claim 16, wherein the communication between the first communications device and the second communications device is application layer communication.

22. The method of claim 16, wherein the second communications device is a data server.

23. A first communications device for enabling secure communication between the first communications device and a second communications device, the first communications device comprising:
processing circuitry;
memory containing instructions executable by the processing circuitry whereby the first communications device is operative to:
perform a network attachment procedure with an authentication server in response to a request from the second communications device;
establish, during the network attachment procedure, a shared secret between the first communications device and the authentication server, wherein the shared secret is established by running an authentication and key agreement protocol as part of the network attachment procedure with a network access identity of the first communications device as input;
derive an application level shared key for the first communications device from the shared secret, wherein the application level shared key is to be used for secure communication between the first communications device and the second communications device;

the request from the second communications device comprising an access token;
the request from the second communications device comprising one of a public key and certificate of the second communications device;
the access token comprising a hash of the one of public key and certificate as determined by the first communications device; and
the application level shared key for the first communications device only being derived when there is a match between the hash and a hash, determined by the authentication server, of the one of the public key and certificate comprised in the access token.

24. An authentication server for enabling secure communication between a first communications device and a second communications device, the authentication server comprising:
processing circuitry;
memory containing instructions executable by the processing circuitry whereby the authentication server is operative to:
perform a network attachment procedure with the first communications device in response to a request from the first communications device;
establish, during the network attachment procedure, a shared secret between the authentication server and the first communications device, wherein the shared secret is established by running an authentication and key agreement protocol as part of the network attachment procedure with a network access identity of the first communications device as input;
receive a request from the second communications device for an application level shared key, wherein the application level shared key is to be used for secure communication between the first communications device and the second communications device;
derive the application level shared key for the first communications device from the shared secret;
provide the application level shared key to the second communications device;
the instructions comprising an access token;
the request to the authentication server comprising one of a public key and certificate of the second communications device;
the access token comprising a session identifier, information about which authentication server to provide the request to and a hash of the one of the public key and certificate as determined by the first communications device; and
the access token being provided to the authentication server in the request.

25. A second communications device for enabling secure communication between a first communications device and the second communications device, the second communications device comprising:
processing circuitry;
memory containing instructions executable by the processing circuitry whereby the second communications device is operative to:
receive instructions from the first communications device to retrieve an application level shared key from an authentication server when establishing the secure communication with the first communications device, wherein the application level shared key is to be used for the secure communication between the first communications device and the second communications device;
provide a request for the application level shared key from the authentication server;
receive the application level shared key from the authentication server;
the instructions comprising an access token;
the request to the authentication server comprising one of a public key and certificate of the second communications device;
the access token comprising a session identifier, information about which authentication server to provide the request to and a hash of the one of the public key and certificate as determined by the second communications device; and
the access token being provided to the authentication server in the request.

* * * * *